United States Patent
Jones

(10) Patent No.: US 7,222,525 B1
(45) Date of Patent: May 29, 2007

(54) SKIN AND TISSUE SIMULANT FOR MUNITIONS TESTING

(75) Inventor: Dennis J. Jones, Shoals, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 254 days.

(21) Appl. No.: 11/001,612

(22) Filed: Nov. 30, 2004

(51) Int. Cl.
   *G01L 5/14* (2006.01)
(52) U.S. Cl. ............................................. 73/167
(58) Field of Classification Search ............... None
   See application file for complete search history.

(56) References Cited

U.S. PATENT DOCUMENTS

| | | | | |
|---|---|---|---|---|
| 4,453,408 A | * | 6/1984 | Clayman | 73/1.86 |
| 5,531,113 A | * | 7/1996 | Jamison | 73/167 |
| 5,850,033 A | * | 12/1998 | Mirzeabasov et al. | 73/12.01 |
| 6,318,146 B1 | * | 11/2001 | Madsen et al. | 73/1.86 |
| 6,475,800 B1 | | 11/2002 | Hazen et al. | 436/8 |
| 6,769,286 B2 | * | 8/2004 | Biermann et al. | 73/12.01 |
| 2003/0066365 A1 | * | 4/2003 | Biermann et al. | 73/866.4 |
| 2003/0200800 A1 | * | 10/2003 | Duke | 73/167 |
| 2004/0067591 A1 | * | 4/2004 | Madsen et al. | 436/8 |

FOREIGN PATENT DOCUMENTS

JP    63-80314    *  4/1988

OTHER PUBLICATIONS

Duncan MacPherson, Bullet Penetration Modeling the Dynamics and the Incapacitation Resulting from Wound Trauma, 1994, Ballistic Publications, pp. 74, 85, 227.

D.B. Dahlstron, K.D. Powley, D. MacPherson, TR-03-98 Lead Shot Penetration in 10% Ordnance Gelatin, 1995, Canadian Police Research Centre.

Test Procedure Ballistic Gelatin Blocks, May 1998, HP White Laboratory Inc., Street, Maryland.

* cited by examiner

*Primary Examiner*—Robert Raevis
(74) *Attorney, Agent, or Firm*—John Gladstone Mills, III; Mark O. Glut; Navair (Naval Air Systems Command)

(57) ABSTRACT

A skin and tissue simulant including a gelatin composite block and an ether based cast polyurethane sheet. The gelatin composite block acting as the tissue simulant. The sheet acting as the skin simulant, the sheet disposed over a portion of the gelatin composite block.

6 Claims, 1 Drawing Sheet

SKIN AND TISSUE SIMULANT FOR MUNITIONS TESTING

STATEMENT OF GOVERNMENT INTEREST

The invention described herein may be manufactured and used by or for the Government of the United States of America for governmental purposes without payment of any royalties thereon or therefor.

BACKGROUND

The present invention relates to a skin and tissue simulant. More specifically, but without limitation, the present invention relates to a skin and tissue simulant for determining the potential of a given munition projectile to penetrate skin over a soft tissue area of the human body. The present invention also relates to a skin-tissue simulant physical ballistic penetration model.

The present method of determining the penetration potential of a munition projectile is to fire the munition projectile into uncovered or covered gelatin or clay materials. The material used in the covered gelatin or clay is frequently a T-shirt type fabric. Nominal 10% ordnance gelatin is considered to be the most accurate human tissue similant. However, this type of simulant does not replicate the significant resistance that human skin provides in preventing penetration into human tissue. This is a significant shortcoming in the present method of determining the penetration potential of munition projectiles. A more realistic penetration model would be a model that would simulate human skin over soft tissue areas of the human body. Such a model would include a skin simulant disposed over a tissue simulant. The tissue simulant that is universally accepted in the ordnance community is nominal 10% ordnance gelatin. However, the ordnance community has had difficulty finding a good skin simulant. Raw pigskins can be used; however, pigskins have wide variations in the skin characteristics, and present hygiene concerns. Natural rubber can be used, but it is not a consistently good skin simulant because of variations in raw materials.

The basis for judging a good synthetic skin/tissue physical penetration model is found in tests conducted on cadavers as noted in Table 9-1 on page 227 of the book entitled "Bullet Penetration, Modeling the Dynamics and Incapacitation Resulting from Wound Trauma" by Duncan McPherson. The data from testing by DeMaio on cadavers, reveals that a nominal 4.5 mm air gun pellet (BB) fired at velocities between 290 and 360 feet per second will penetrate skin over tissue areas of the human body. Table 9-1 is incorporated herein by reference. In addition, page 85 of the text contains the statement "the most representative known tissue simulant is 10% ordnance gelatin. The proper procedure for preparation and use of 10% ordnance gelatin has been well documented. Other tissue simulants are inferior and often invalid in penetration evaluation, but can be useful for testing of other parameters."

Thus, there is a need in the art to provide a skin and tissue simulant that incorporates the listed benefits without the limitations inherent in present methods. For the foregoing reasons, there is a need for a skin and tissue simulant.

SUMMARY

The instant invention is directed to a skin and tissue simulant that satisfies the needs enumerated above and below.

The present invention is directed to a skin and tissue simulant that includes a gelatin composite block and an ether based cast polyurethane sheet. The gelatin composite block acts as the tissue simulant. The sheet acts as the skin simulant, and is disposed over the gelatin composite block.

The present invention is directed to a skin and tissue simulant that simulates human skin over soft tissue for, but without limitation, determining the penetration potential of a munition projectile.

BRIEF DESCRIPTION OF THE DRAWINGS

These and other features, aspects and advantages of the present invention will become better understood with reference to the following description and appended claims, and accompanying drawings wherein:

DETAILED DESCRIPTION OF THE INVENTION

Figure 1:
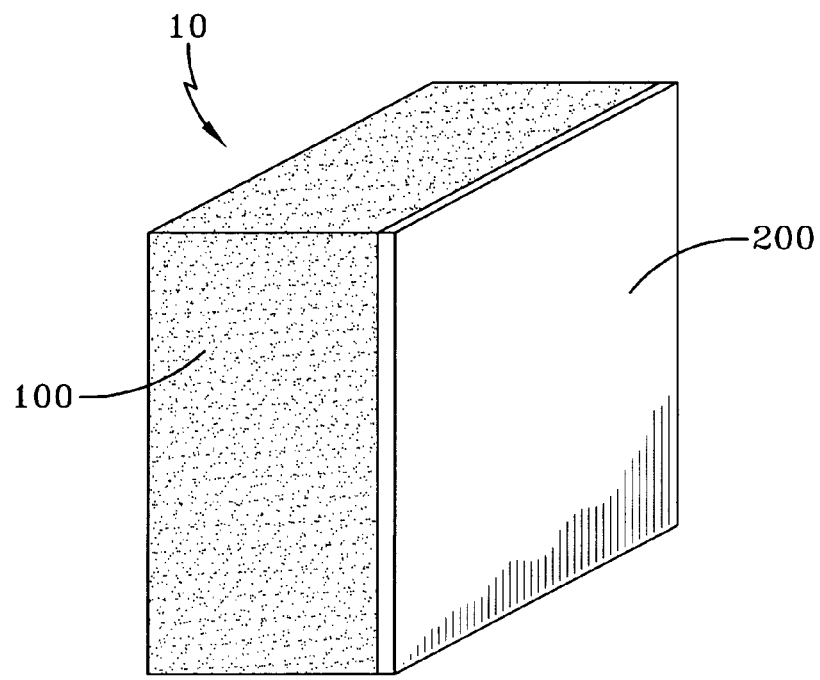
FIG. 1 is a side perspective view of an embodiment of the skin and tissue simulant.

The preferred embodiments of the present invention are illustrated by way of example below and in FIGS. 1 and 2. As seen in FIG. 1, a skin and tissue simulant 10 includes a gelatin composite block 100 and an ether based cast polyurethane sheet 200. The gelatin composite block 100 acts as the tissue simulant, while the sheet 200 acts as the skin simulant. The gelatin block may be nominal 10% ordnance gelatin. In the preferred embodiment, the gelatin block is about 11% by weight gelatin. The sheet 200 is disposed over, clings to or encompasses the gelatin composite block 100, particularly the firing face of the gelatin composite block 100.

The gelatin composite block 100 can be made by mixing ordnance gelatin and hot water. In another embodiment, the gelatin composite block 100 can also be made by mixing ordnance gelatin, hot water, a defoaming compound, and a preservative. The defoaming compound used may be "Foam Eater" by Trace Chemical in Perkin, Ill. The preferred preservative is cinnamon oil.

The gelatin is typically in powdered form. The preferred temperature of the water is about 150 to about 160 degrees Fahrenheit. The preferred method of preparing the gelatin composite block 100 includes: adding the powdered gelatin to the water (and adding any possible additional ingredients); thoroughly mixing the composition; then pouring the mixture into a mold; and refrigerating the mixture and mold at about 40° F. The preferred gelatin is 250 Bloom Type A Ordnance Gelatin. The 11% gelatin (by weight) mixture utilizes a ratio of about 7.5 pounds of gelatin to about 61 pounds of water. For best results, the prepared gelatin composite block 100 should be kept refrigerated for about 48 hours before being used. The preferred embodiment requires the prepared gelatin composite block 100 not be used for at least 48 hours after refrigerating.

In the preferred embodiment of the invention, the gelatin composite block 100 is calibrated to properly simulate tissue as to munition penetration. In a preferred embodiment, the completed gelatin composite block 100 may meet the calibration (penetration) requirements as follows: using a suitable means of measuring velocity near the firing face of the gelatin block 100, using a pump air rifle (BB gun), fire three (3) round pellets (BB's) having a diameter of about 0.171 inch diameter into the gelatin block 100 at a velocity of about 591±13 feet/second (FPS). Each of the three (3) shots must penetrate the gelatin block between about 3.20 and about 3.50 inches. In a preferred embodiment, the skin and tissue simulant 10 is penetrable at projectile velocities above about 350 feet per second and not penetrable at projectile velocities below about 300 feet per second. At velocities between about 300 and 350 feet per second, penetration may or may not occur.

The preferred ether based cast polyurethane sheet 200 has a percent elongation of about 1,400%, a modulus of elasticity of about 27 pounds per square inch, an ultimate tensile strength of about 375 pounds per square inch, and a Shore A Durometer hardness of about 33. The preferred ether based cast polyurethane sheet 200 is Formula #SS35 ether based cast polyurethane material, manufactured by PSI Urethanes, Inc. in Austin, Tex. In the preferred embodiment, the ether based cast polyurethane sheet 200 has thickness of about 0.012±0.001 inches. The height of each sheet may be cut to the height of the firing face of the gelatin block plus about 3.50±0.25 inches, so that it can be somewhat draped over the top of the gelatin block 100. The width may be cut to the width of the firing face of the gelatin block plus about 1.00±0.25 inches.

Figure 2:
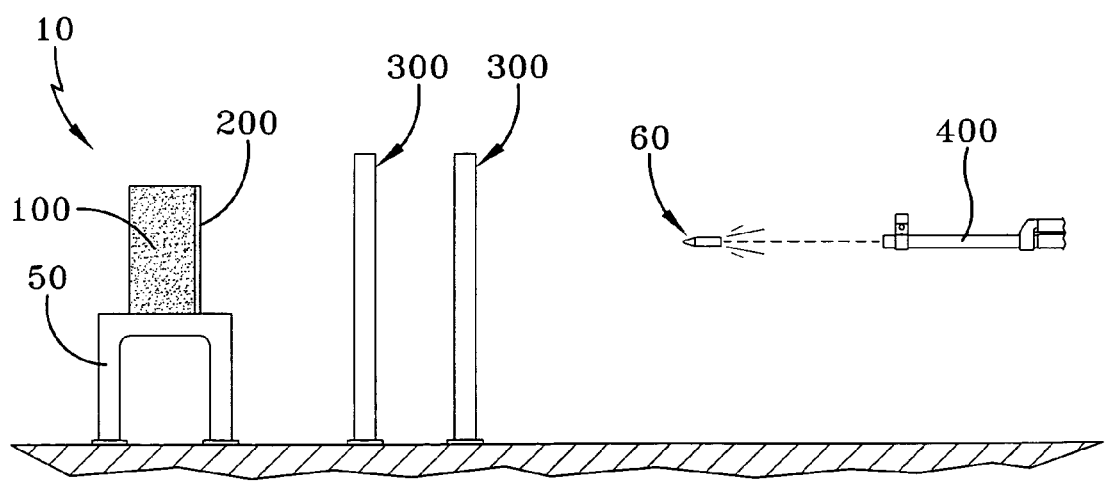
FIG. 2 is a side view of a typical test set up for a skin-tissue simulant physical ballistic penetration model.

FIG. 2 shows a typical test set-up. The set-up includes a skin and tissue simulant 10 placed upon a stand 50 or table (the fired upon side having the polyurethane sheet 200), a velocity measuring system 300, and a weapon 400 that fires the projectile 60 from the munition being tested. As seen in FIG. 2, the projectile 60 is fired into the skin and tissue simulant 10.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred versions thereof, other versions are possible. Therefore, the spirit and scope of the appended claims should not be limited to the description of the preferred versions contained herein.

What is claimed is:

1. A skin and tissue simulant comprising:
   a gelatin composite block, the gelatin composite block is prepared by mixing ordnance gelatin, hot water, cinnamon oil, and a defoaming compound, pouring the mixture into a mold, and refrigerating the mixture, the gelatin composite block acting as the tissue simulant, the gelatin block about 11% by weight gelatin; and
   an ether based cast polyurethane sheet, the sheet acting as the skin simulant, the sheet disposed over a portion of the gelatin composite block.

2. A skin and tissue simulant for testing munitions, comprising:
   a gelatin composite block, the gelatin composite block acting as the tissue simulant, the gelatin block about 11% by weight gelatin, the gelatin composite block is prepared by mixing ordnance gelatin, hot water, cinnamon oil, and a defoaming compound, pouring the mixture into a mold, and refrigerating the mixture, the temperature of the hot water being about 150 to about 160 degrees Fahrenheit, the mixed ordnance gelatin and hot water being refrigerated at a temperature of about 40° F.; and
   an ether based cast polyurethane sheet, the sheet acting as the skin simulant, the sheet disposed over a portion of the gelatin composite block.

3. The skin and tissue simulant of claim 2 wherein the gelatin composite block is refrigerated for at least 48 hours until it is used.

4. The skin and tissue simulant of claim 3, wherein the ether based cast polyurethane sheet has a modulus of elasticity of about 27 pounds per square inch.

5. The skin and tissue simulant of claim 4, wherein the ether based cast polyurethane sheet has a Shore A Durometer hardness of about 33.

6. The skin and tissue simulant of claim 5, wherein the ether based cast polyurethane sheet has a ultimate tensile strength of about 375 pounds per square inch.

* * * * *